Nov. 24, 1931.  M. A. VIOLET  1,833,802
EXPLOSION ENGINE
Filed Aug. 16, 1927   2 Sheets-Sheet 1

Inventor
Marcel A. Violet

Nov. 24, 1931.  M. A. VIOLET  1,833,802

EXPLOSION ENGINE

Filed Aug. 16, 1927  2 Sheets-Sheet 2

Inventor
Marcel A. Violet,
By
  Atty.

Patented Nov. 24, 1931

1,833,802

UNITED STATES PATENT OFFICE

MARCEL ACHILLE VIOLET, OF COURBEVOIE, FRANCE

EXPLOSION ENGINE

Application filed August 16, 1927, Serial No. 213,382, and in France August 17, 1926.

It is known that in explosion engines, the efficiency is a function of compression. For each fuel there exists a compression point, beyond which "self"-ignition takes place. The engines are therefore built in such a manner that with the full admission, the compression should be near that point, without however reaching it. It is clear that with the reduced admission, compression decreases, and therefore the efficiency also decreases. It has been attempted by various processes to maintain compression at its maximum value whatever be the degree of admission. The processes employed whilst improving the thermic efficiency, reduced considerably the mechanical efficiency of the engines, so that the result obtained did not give satisfaction.

The present invention relates to a process which enables the best rate of consumption to be maintained, and consists in re-introducing into the cylinder the desired quantity of the exaust gas through orifices provided in the cylinder and uncovered by the piston when the latter is at the bottom dead centre. These orifices are connected to an expansion reservoir which, in its turn, is preferably connected to the exhaust pipe. If desired, a cock or any other regulating device may be arranged between the expansion reservoir and the exhaust orifices. This arrangement makes it possible to introduce into the cylinder, when the engine is running with reduced admission a certain quantity of the combustion gases which occupy the lower portion of the cylinder between the piston and the fresh admission gases, and constitute, owing to the stratification, a gas cushion which reduces the explosion chamber and enables the fresh gases to explode at the best compression.

Figure 1:
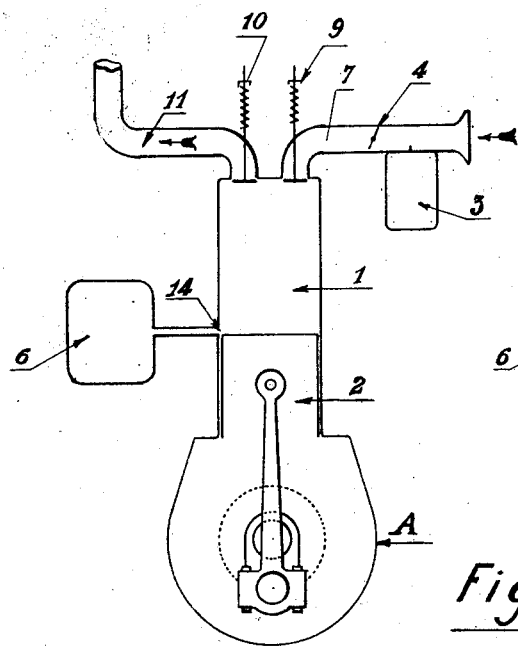
Figure 2:
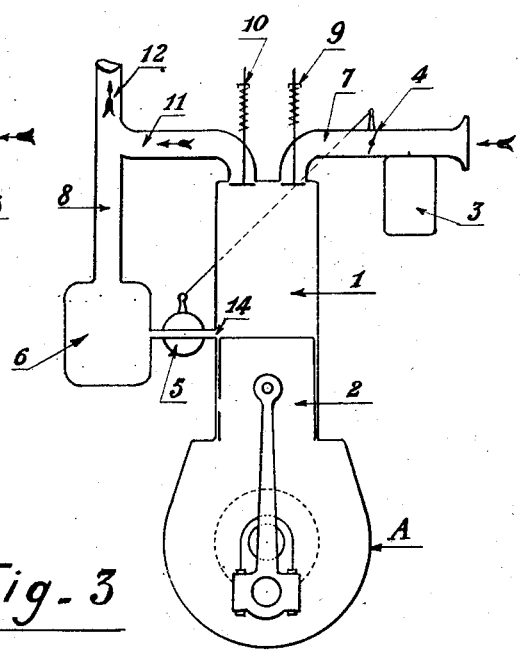
Figure 3:
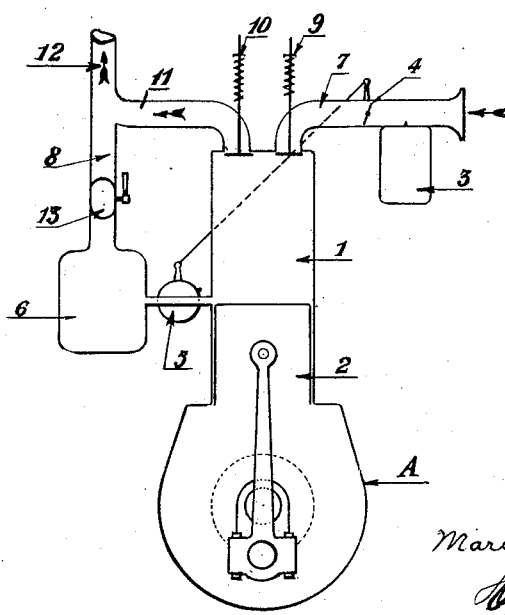
Figure 5:
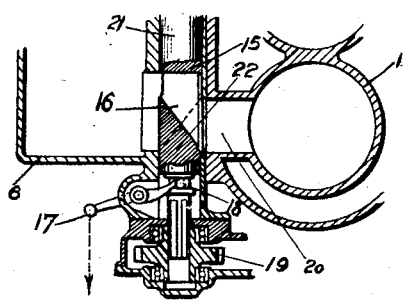
Figure 6:
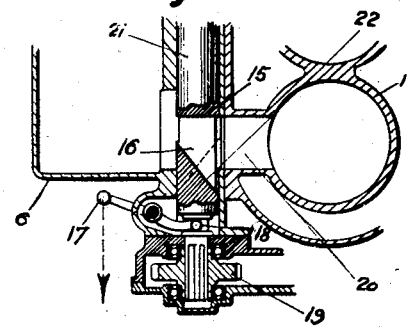
Figure 4:
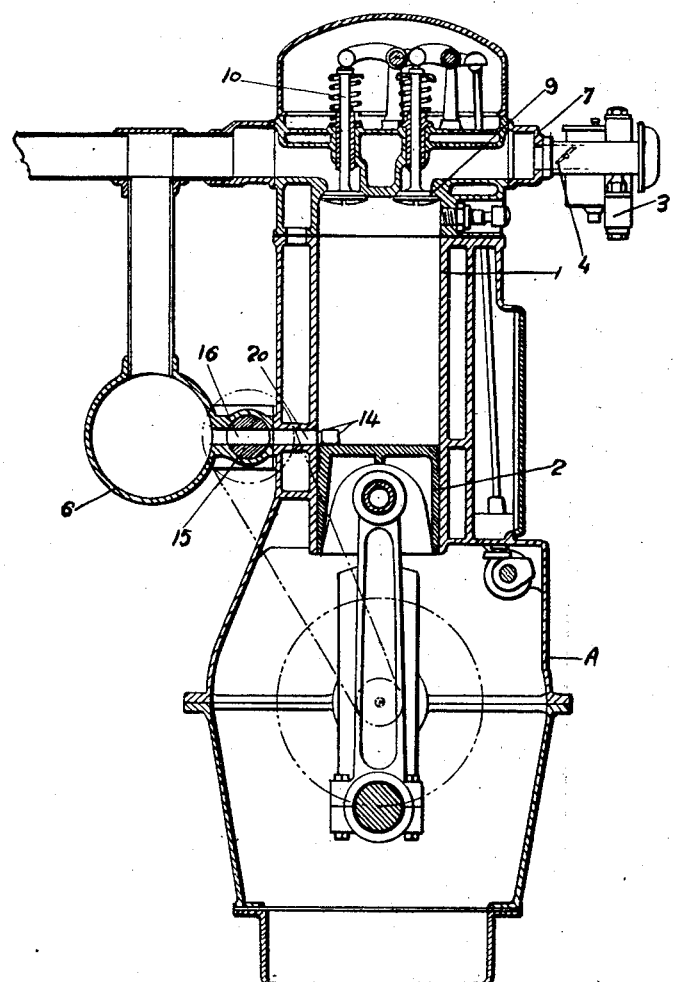

The accompanying drawings show by way of example a construction of an engine provided with a device according to the invention. In the said drawings:

Figure 1 shows an explosion engine provided with the device according to the invention, without communication between the reservoir and the exhaust Figure 2 is a modified construction in which the expansion reservoir is in communication with the exhaust pipe, and in which the pipe which connects the said reservoir to the orifices provided in the cylinder, is provided with a throttling valve Figure 3 shows another modified construction, more particularly intended for aircraft motors Figure 4 shows in cross section an engine of the same type, provided with devices according to the invention and comprising a rotary distributor for the control of the member which uncovers the orifices which establish communication between the interior of the cylinder and the expansion reservoir Figures 5 and 6 are two horizontal sections through the axis of the rotary distributor indicated in Figure 4, these two views corresponding to two different positions of the regulating member of this distributor.

The engine comprises a crank case A and a certain number of cylinders 1 in which travel pistons 2. 9 is the admission valve, 7 the admission piping coming from the carburettor 3. 4 is the throttle or valve for regulating the gas.

At the lower dead centre of the cylinder are arranged one or more orifices 14 which are in communication with an expansion reservoir 6. This reservoir may be closed as shown in Figure 1 or connected by a tube 8 to the exhaust pipe 12 as shown in the other figures. The pipe connecting the orifices 14 to the expansion reservoir may be provided with a throttling valve 5 (see Figures 2 and 3) either independent of, or connected in any desired manner to, the throttle 4. Obviously this valve 5 may be of any desired construction.

The working of the engine is as follows:
At the end of the driving stroke, the exhaust gases escape through the orifices 14. This fact in itself is a considerable advantage owing to a better evacuation of the combustion gases, a reduction of strains on the exhaust valves, a reduction of the heating due to the sudden expansion of the gases and to the decrease of the back pressure during the exhaust phase. Moreover, the gases which escape through the orifices 14 sweep the surface of the piston and remove from it the "calamine" and other residues of combustion. The piston 1 rises then and expels the rest of the combustion gases through the exhaust valve 10, then descends again and draws in fresh gases through the admission valve 9. If the carburettor is not open sufficiently to make a complete filling of the cylinder possible, when the piston arrives at the bottom of its stroke and when it uncovers again the orifices 14, there takes place a reintroduction of combustion gases coming from the expansion chamber 6, which complete the filling of the cylinder. When the piston rises and makes its compression stroke, the cylinder is therefore completely full, and is filled partly by the fresh gases, and partly by the combustion gases. Owing to the combustion gases being introduced at the lower dead centre, a real stratification is produced, and the combustion gases are practically not mixed at all with the fresh gases, but form a neutral layer interpolated between the fresh gases and the piston. The reintroduced combustion gases play several parts, to wit:— firstly they allow the recovery of a certain amount of heat which is transferred to the fresh gases; furthermore they reduce, by their presence, the capacity of the compression chamber reserved for the fresh gases, and cause the latter to explode at the best compression point.

When the engine is working with full admission, the running is not modified by the device according to the invention, and there will always be the advantage of the anticipated exhaust through the orifices 14.

In the construction of Figure 1, the reservoir 6 is closed, and therefore the pressure in the interior of the said reservoir will always be a maximum.

In the construction of Figure 2, the reservoir 6 is in communication with the atmosphere and therefore the pressure is always a minimum.

In the construction of Figure 3, the pipe 8 is provided with a regulating member 13, to be described hereinafter which enables the pressure in the reservoir to be given the desired value.

When using the device according to the invention for aviation engines, the advantages obtained are still more considerable. In such a case, the engine will be preferably built as shown in Figure 3. A valve 13 is mounted in the piping 8 connecting the expansion reservoir 6 to the exhaust pipe 12 which is in communication with the atmosphere. The exhaust gases when they escape at the end of the stroke through the orifices 14, still have a certain pressure. By acting on the outlet valve 13 of the expansion reservoir 6, the whole, or part, of the said pressure can be maintained in the said reservoir. The quantity of inert gases which can be reintroduced into the cylinder, will therefore vary with the pressure maintained in the expansion reservoir. It must be pointed out that no back pressure is produced on the piston, the exhaust valve remaining open during the whole upstroke of the piston, after the orifices 14 are closed by the piston. Another not less important advantage is that the device according to the invention makes it possible to utilize heavy fuels which cannot be utilized in an ordinary engine. Obviously starting and slow running would be preferably insured with a volatile fuel such as gasoline.

In Figures 4 to 6 is shown a construction more particularly intended for engines with a very long stroke. In fact, in such engines it is often difficult to close, at the end of the upstroke, the orifices 14 communicating with the expansion reservoir, as the piston, in order to perform this operation, would have to be of excessive height.

In order to reduce the height of the piston and assure the alternate closing and opening of the orifices arranged in the lower portion of the cylinder, in the pipe which establishes communication between the expansion reservoir and the said orifices, is mounted a rotary distributor rotating with half the speed of the engine.

This distributor is constituted by a solid cylindrical body provided along a diameter with a perforation or bore of a given shape. While the piston makes its four strokes, the cylindrical body makes one complete revolution. The position of the opening is adjusted in such a manner that the interior of the cylinder is connected to the expansion reservoir only at the end of the explosion stroke and at the end of the admission stroke.

This distributor may also be built so that it enables the quantity of the combustion gases passing through its orifices into the cylinder, to be regulated, or the admission of the said gases even to be shut off completely if desired.

The rotary distributor 15 rotating at half the speed of the engine may be driven by means of a chain, gear wheels or of any other suitable device.

In Figure 4, the distributor 15 is shown in the position in which the communication is established between a pipe 20 which communicates with the orifices 14, on the one hand, and the expansion reservoir 6, on the other hand. This position corresponds to the lower position of the piston. When the piston rises, the distributor makes a certain fraction of a revolution, and its solid portion shuts off communication between the interior of the cylinder and the reservoir 6. When the piston returns to the position of Figure 4, the engine has made a complete revolution, and the distributor which rotates at half the speed of the engine, has made half a revolution. The communication is reestablished, and is cut again only after a new fraction of a revolution.

If it is desired to obtain regulation of the quantity of the gases reintroduced into the cylinder at the end of the admission stroke, the rotating part of the distributor 15 may be adapted to slide in the interior of its casing 21. This rotating portion of the distributor has a sleeve provided with grooves or keys intended to ensure the guiding of the part in question during its sliding in the interior of the hole.

The rotary distributor 15 is provided with an orifice 16 arranged in such a manner that it makes possible the escape of the combustion gases at the end of the exhaust stroke, whatever be the position in the longitudinal direction of the distributor. This hole 16 could be for instance of the shape shown in Figures 5 and 6. During the rotation of the distributor, the part 22 occupies successively the position shown in full lines, and the position shown in dotted lines.

When the distributor is in the position shown in Figure 5, the part 22 in the position shown dotted closes entirely, the pipe 20, thus preventing the combustion gases from being reintroduced into the cylinder, whilst allowing the evacuation of the said gases at the end of the exhaust stroke, the part 22 being at that moment in the position shown in the same figure in full lines. In the position of Figure 6, the distributor having slid a certain length, the part 22, in the position shown dotted, no longer closes completely the pipe 20, the reintroduction of the gases thus being rendered possible. The distributor 15 can be moved in the longitudinal direction by means of any desired device. In Figures 5 and 6 is shown a construction of such a device. The distributor which is rotated in a continuous manner by means of the pinion 19, can be moved in the longitudinal direction by means of a control acting on fork 17 engaging a collar 18 on the sliding member. In Figures 5 and 6 are shown two positions of the fork, corresponding to two different positions of the sliding member.

When the engine is running with full admission, the rotary distributor will be set either by means of an independent control, or by means of a control conjugated with that of the accelerator, so as to reduce to a minimum or even to shut off entirely, the reintroduction of the combustion gases, whilst retaining the advantages of exhaust through the orifices arranged at the lower portion of the cylinder.

It must be understood that the invention is not limited to the constructions illustrated which have been given merely in order to make the invention clear, and that the device can be applied to any existing explosion engines, and that the reintroduction of the combustion gases may be effected in any desired manner without departing from the spirit of the invention as comprehended within the scope of the appended claims.

For instance, sleeve valve engines having any desired motion (reciprocating, rotary, mixed etc.) could be modified according to the invention. In such engines the sleeve valves may be utilized for obtaining the results desired, either by displacing the control means or by adding an extra sleeve or by any other suitable means. An almost similar, though less perfect, result may also be obtained by acting on the exhaust valve in the case of an engine with poppet valves. At the end of the admission, the valve is raised by a suitable cam. The exhaust valve acts then twice for two revolutions of the engine; a first time normally, and a second time, at the end of the admission. This process is less to be recommended as it produces a certain mixing of fresh gases with the combustion gases which can be introduced only in a limited quantity.

It must be further understood that the distributor described with reference to Figures 4 to 6, might be replaced by any other desired device having a continuous motion of rotation at half the speed of the engine, and enabling communication between the orifices arranged in the lower portion of the cylinder, and the expansion reservoir, to be alternately established and suppressed, whilst making possible if desired the regulation of the opening at the moment of reintroduction of the combustion gases, this device being controlled in any desired manner whatsoever.

Having described my invention what I claim as new and desire to secure by Letters Patent is:

1. In an internal combustion engine having a cylinder, a motor piston in said cylinder and an exhaust manifold for said cylinder, the combination of an auxiliary exhaust port for said cylinder, adapted to be uncovered by the piston at the end of its outward stroke, a closed expansion chamber, single means connecting said chamber to said exhaust port, and a rotary distributor adapted to be actuated by said engine for opening said means at the end of each outward stroke of the piston.

2. In an internal combustion engine having a cylinder, a motor piston in said cylinder and an exhaust manifold for said cylinder, the combination of an auxiliary exhaust port for said cylinder, adapted to be uncovered at the end of its outward stroke, a closed expansion chamber, single means connecting said chamber to said exhaust port, and a rotary distributor adapted to be actuated by said engine at half the speed thereof for opening last mentioned means at the end of the outward strokes of the piston.

3. In an internal combustion engine having a cylinder, a motor piston in said cylinder and an exhaust manifold for said cylinder, the combination of an auxiliary exhaust port for said cylinder, adapted to be uncovered at the end of the outward stroke of the piston, an expansion chamber, single means connecting said chamber to said exhaust port, means associated with last mentioned means adapted to be actuated by said engine for opening periodically the former means at the end of the outward strokes of the piston and means for adjusting the opening afforded by said first mentioned means during operation thereof.

4. In an internal combustion engine having a cylinder, a motor piston in said cylinder and an exhaust manifold for said cylinder, the combination of an auxiliary exhaust port for said cylinder, an expansion chamber, a conduit connecting said chamber to said exhaust manifold, a conduit connecting said chamber to said exhaust port, a valve adapted to be actuated by said engine for opening the second conduit at the end of each outward stroke of the piston and means adapted to be actuated by the throttle of said engine for adjusting the opening of said valve during operation of the said engine.

5. In an internal combustion engine having a cylinder, a motor piston in said cylinder and an exhaust manifold for said cylinder, the combination of an auxiliary exhaust port for said cylinder, an expansion chamber, a conduit connecting said chamber to said exhaust manifold, a conduit connecting said chamber to said exhaust port, means adapted to be actuated by said engine for opening the second conduit at the end of the outward stroke of the piston, and means adapted to be actuated by the throttle of said engine for adjusting the opening of last mentioned means during operation of the engine.

6. In an internal combustion engine having a cylinder, a motor piston in said cylinder and an exhaust manifold for said cylinder, the combination of an auxiliary exhaust port for said cylinder, an expansion chamber, a conduit connecting said chamber to said exhaust manifold, a conduit connecting said chamber to said exhaust port, a rotary distributor adapted to be actuated by said engine for opening the second conduit at the end of the outward strokes of the piston and means adapted to be actuated by the throttle of said engine for adjusting the maximum opening of said distributor during rotation of the engine.

7. In an internal combustion engine having a cylinder, a motor piston in said cylinder and an exhaust manifold for said cylinder, the combination of an auxiliary exhaust port for said cylinder, adapted to be uncovered at the outer dead point of the piston, an expansion chamber, single means connecting said chamber to said exhaust port, a rotary distributor in said connecting means provided with a diametral passage, oblique with reference to the connecting means, means whereby the engine controls the rotation of said distributor for alining the passage with the connecting means at the end of each outward stroke of the piston and means for axially displacing the distributor.

8. In an internal combustion engine having a cylinder, a motor piston in said cylinder and an exhaust manifold for said cylinder, the combination of an auxiliary exhaust port for said cylinder, an expansion chamber, a conduit connecting said chamber to said exhaust manifold, a conduit connecting said chamber to said exhaust port, a rotary distributor in the latter conduit having an oblique extremity, a collar on said distributor, and a lever adapted to be actuated by the throttle of said engine for axially displacing said distributor.

9. In an internal combustion engine having a cylinder, a motor piston therein and admission and exhaust means for said cylinder, the combination of an auxiliary exhaust port for said cylinder adapted to be uncovered at the end of the outward stroke of the piston, an expansion chamber provided with a single connection with the cylinder through the auxiliary exhaust port and wherein the exhaust gases are adapted to be stored under pressure above atmospheric pressure, a rotary engine driven distributor in said connection and means to axially move the distributor to vary the quantity of exhaust gas admitted to the cylinder through said auxiliary port.

In testimony that I claim the foregoing as my invention, I have signed my name.

MARCEL ACHILLE VIOLET.